United States Patent [19]

Balducci et al.

[11] 4,251,283
[45] Feb. 17, 1981

[54] BISMUTH VANADATE PIGMENTS AND PROCESS FOR PREPARING SAME

[75] Inventors: Luigi Balducci; Massimo Rustioni, both of Alessandria, Italy

[73] Assignee: Montedison S.p.A., Milan, Italy

[21] Appl. No.: 81,923

[22] Filed: Oct. 4, 1979

[30] Foreign Application Priority Data

Oct. 6, 1978 [IT] Italy ............................. 28495 A/78

[51] Int. Cl.$^3$ .......................... C09C 1/00; C09C 1/02; C09C 1/04
[52] U.S. Cl. ............................. 106/296; 106/288 B; 106/306; 106/309
[58] Field of Search .................... 106/288 B, 296, 306, 106/309

[56] References Cited

U.S. PATENT DOCUMENTS

| 4,026,722 | 5/1977 | Hess | 106/288 B |
|---|---|---|---|
| 4,063,956 | 12/1977 | Higgins | 106/288 B |
| 4,115,141 | 9/1978 | Piltingsrud | 106/288 B |
| 4,115,142 | 9/1978 | Hess | 106/288 B |

Primary Examiner—O. R. Vertiz
Assistant Examiner—Mark Bell

[57] ABSTRACT

New greenish-yellow pigments based on $BiVO_4$ are disclosed. The pigments consist of the product obtained by the calcination, in the presence of air, of a mixture of $BiPO_4$, $V_2O_5$ and an oxide MeO, in which Me is Ca, Ba, Mg or Zn, said calcining being conducted at a temperature of between 500° and 800° C. when Me is Ca, Ba or Mg; and between 500° and 700° C. when Me is Zn, the calcination being then followed by a slow cooling down and by wet grinding. These pigments show a molar ratio $Bi_2O_3/P_2O_5$ equal to 1 while their molar ratios $Bi_2O_3/V_2O_5$ are within given ranges, which depend on the nature of Me.

6 Claims, No Drawings

BISMUTH VANADATE PIGMENTS AND PROCESS FOR PREPARING SAME

THE PRIOR ART

The greenish-yellow inorganic pigments most widely used are the chrome yellows (based on lead chromate), the cadmium yellows (based on cadmium sulphide) and the cadmiopone yellows (based on cadmium sulphide and barium sulphate). Since they contain lead and hexavalent chromium or cadmium, these pigments are suspected of being toxic.

There also exist alternative pigments of the same color, based on nickel titanates $TiO_2$—$NiO$—$Sb_2O_3$, which do not have, however, properties comparable with those of the aforementioned pigments as far as concerns color saturation (color intensity), colorimetric purity and tinting strength.

It has also been proposed to use bismuth vanadate $BiVO_4$ of monoclinic crystalline structure as a substitute pigment: in fact this product shows optical and pigmentary properties similar to those of the chrome yellow "primerose". However, its cost is too high due to the high price of the raw materials used for its preparation, i.e., vanadium and bismuth compounds. Furthermore, it is not endowed with a high thermic stability.

THE PRESENT INVENTION

One object of this invention is that of providing new greenish-yellow pigments that are free of chromium, lead and cadmium and are endowed with optical characteristics similar to those of the chrome yellow, cadmium yellow and cadmiopone yellow pigments of a greenish shade.

Another object of this invention is that of providing new pigments based on $BiVO_4$ that are cheaper than the pigment consisting of $BiVO_4$ only, thanks to the presence of other compounds of lower cost and that are endowed with a higher thermic stability than the pigment consisting of $BiVO_4$ only.

Still another object of this invention is that of providing a process for obtaining the above-mentioned new pigments.

These and other objects are achieved by this invention which provides greenish-yellow pigments based on bismuth vanadate, having a dominant wave length comprised between 573 and 575 m$\mu$, and which consist of the product resulting from the calcination, in the presence of air, of a mixture of $BiPO_4$, $V_2O_5$ and a metal oxide MeO, in which latter Me is Ca, Ba, Mg or Zn, the calcining being conducted at a temperature of between 500° and 800° C. when Me is Ca, Ba and Mg, and between 500° and 700° C. when Me is Zn, and then followed by a slow cooling down and by wet grinding.

The pigments of this invention show a molar ratio $Bi_2O_3/P_2O_5$ equal to 1 and a molar ratio $Bi_2O_3/V_2O_5$ comprised between 1.39 and 5.59 in the case of Ca, Ba and Zn and between 1.39 and 2.79 in the case of Mg while their molar ratio $MeO/V_2O_5$ varies according to the molar ratio $Bi_2O_3/V_2O_5$ as indicated below:

| Molar ratio $Bi_2O_3/V_2O_5$ | Molar ratio $CaO/V_2O_5$ and $ZnO/V_2O_5$ | Molar ratio $BaO/V_2O_5$ | Molar ratio $MgO/V_2O_5$ |
| --- | --- | --- | --- |
| 5.59 | 3–16.7 | 2–6.2 | — |
| 4.19 | 3–12.5 | 2–4.8 | — |
| 3.35 | 3–10.0 | 2–4.2 | — |
| 2.79 | 3–8.3 | 2–3.6 | 2–5.6 |
| 2.39 | 3–7.1 | 2–3.2 | 2–4.8 |
| 2.09 | 3–6.2 | 2–3.0 | 2–4.2 |
| 1.86 | 3–5.5 | 2–2.8 | 2–3.7 |
| 1.67 | 3–5.0 | 2–2.6 | 2–3.3 |
| 1.52 | 3–4.5 | 2–2.4 | 2–3.0 |
| 1.39 | 3–4.2 | 2–2.3 | 2–2.8 |

We have found that the above-mentioned calcination products form pigments of a greenish-yellow color corresponding to a dominant wave length $\lambda_D$ comprised between 573 and 575 m$\mu$. These pigments have excellent optical characteristics that are equal to those of chrome yellows, cadmium yellows and cadmiopone yellows of a greenish shade and that are superior to those of the nickel titanates, particularly with regard to the color saturation, the colorimetric purity and the tinting strength.

The X-rays diffraction analysis of the present pigments puts into evidence the presence of monoclinic bismuth vanadate. There is also present monoclinic bismuth phosphate; its quantity tends to drop with the increase of the molar ratio $MeO/V_2O_5$ until attaining the level of traces when this molar ratio corresponds to the maximum values previously defined. The diffractograms also evidence the presence of compounds that it is not possible to identify through the ASTM tables, but which it is possible to hypothesize may be reaction products between $P_2O_5$ and MeO.

The percent composition by weight of the pigments in $Bi_2O_3$, $V_2O_5$, MeO and $P_2O_5$, as a function of the molar ratio $$\frac{Bi_2O_3}{V_2O_5},$$

may be calculated on the basis of the ratios between the four oxides previously defined.

These percent by weight compositions are respectively recorded in Tables 1, 2, 3 and 4 for the pigments containing Ca, Ba, Mg and Zn. The significance of the last two columns on the right hand of the tables is explained infra.

For the values of the molar ratio $Bi_2O_3/V_2O_5$, not reported in the tables, there may be determined the ratios $MeO/V_2O_5$ (and consequently also the ponderal ratios of the various oxides) by the following procedures:

For Ca and Zn the minimum ratio $MeO/V_2O_5$ is always equal to 3, while for Ba and Mg it is always equal to 2. The maximum ratio $MeO/V_2O_5$ may be calculated on the basis of the following empirical equations, obtained on the basis of the experimental data gathered:

for Ca and Zn:

maximum molar ratio $\dfrac{CaO \text{ or } ZnO}{V_2O_5} = 3.0 \times$ molar ratio $\dfrac{Bi_2O_3}{V_2O_5}$

TABLE 1

Pigments Containing Ca

| Molar ratio $Bi_2O_3/V_2O_5$ | Molar ratio $CaO/V_2O_5$ | % $Bi_2O_3$ by weight on the total | % $V_2O_5$ by weight on the total | % CaO by weight on the total | % $P_2O_5$ by weight on the total | % of V by weight on starting $BiPO_4$ | % of Ca by weight on starting $BiPO_4$ |
|---|---|---|---|---|---|---|---|
| 5.59 | 3–16.7 | 69.49–57.62 | 4.85–4.02 | 4.49–20.80 | 21.17–17.55 | 3 | 3.54–19.78 |
| 4.19 | 3–12.5 | 67.39–56.85 | 6.28–5.30 | 5.81–20.53 | 20.53–17.32 | 4 | 4.72–19.78 |
| 3.35 | 3–10.0 | 65.41–56.11 | 7.62–6.53 | 7.04–20.26 | 19.93–17.09 | 5 | 5.90–19.78 |
| 2.79 | 3–8.3 | 63.55–55.39 | 8.88–7.74 | 8.21–20.00 | 19.36–16.87 | 6 | 7.08–19.78 |
| 2.39 | 3–7.1 | 61.79–54.68 | 10.7–8.91 | 9.31–19.74 | 18.82–16.66 | 7 | 8.26–19.78 |
| 2.09 | 3–6.2 | 60.12–53.99 | 11.20–10.06 | 10.36–19.50 | 18.31–16.45 | 8 | 9.44–19.78 |
| 1.86 | 3–5.5 | 58.54–53.32 | 12.27–11.18 | 11.35–19.25 | 17.83–16.24 | 9 | 10.62–19.78 |
| 1.67 | 3–5.0 | 57.05–52.67 | 13.29–12.27 | 12.29–19.02 | 17.38–16.04 | 10 | 11.80–19.78 |
| 1.52 | 3–4.5 | 55.62–52.03 | 14.25–13.33 | 13.18–18.79 | 16.94–15.85 | 11 | 12.98–19.78 |
| 1.39 | 3–4.2 | 54.27–51.41 | 15.17–14.37 | 14.03–18.56 | 16.53–15.66 | 12 | 14.16–19.78 |

TABLE 2

Pigments Containing Ba

| Molar ratio $Bi_2O_3/V_2O_5$ | Molar ratio $BaO/V_2O_5$ | % $Bi_2O_3$ by weight on the total | % $V_2O_5$ by weight on the total | % BaO by weight on the total | % $P_2O_5$ by weight on the total | % of V by weight on starting $BiPO_4$ | % of Ba by weight on starting $BiPO_4$ |
|---|---|---|---|---|---|---|---|
| 5.59 | 2–6.2 | 67.01–57.48 | 4.68–4.02 | 7.90–20.99 | 20.4–17.51 | 3 | 8.09–25.07 |
| 4.19 | 2–4.8 | 64.32–56.35 | 5.99–5.25 | 10.10–21.24 | 19.59–17.16 | 4 | 10.78–25.88 |
| 3.35 | 2–4.2 | 61.83–54.54 | 7.20–6.35 | 12.12–22.49 | 18.83–16.61 | 5 | 13.48–28.31 |
| 2.79 | 2–3.6 | 59.52–53.52 | 8.32–7.48 | 14.03–22.70 | 18.13–16.30 | 6 | 16.18–29.12 |
| 2.39 | 2–3.2 | 57.39–52.43 | 9.35–8.55 | 15.77–23.05 | 17.48–15.97 | 7 | 18.87–30.19 |
| 2.09 | 2–3.0 | 55.40–50.96 | 10.32–9.49 | 17.40–24.01 | 16.88–15.52 | 8 | 21.57–32.35 |
| 1.86 | 2–2.8 | 53.54–49.77 | 11.22–10.43 | 18.92–24.63 | 16.31–15.16 | 9 | 24.26–33.97 |
| 1.67 | 2–2.6 | 51.81–48.83 | 12.07–11.37 | 20.34–24.93 | 15.78–14.87 | 10 | 26.96–35.05 |
| 1.52 | 2–2.4 | 50.18–48.09 | 12.85–12.32 | 21.68–24.93 | 15.29–14.65 | 11 | 29.66–35.59 |
| 1.39 | 2–2.3 | 48.65–46.72 | 13.60–13.06 | 22.93–25.98 | 14.82–14.23 | 12 | 32.35–38.18 |

TABLE 3

Pigments Containing Mg

| Molar ratio $Bi_2O_3/V_2O_5$ | Molar ratio $MgO/V_2O_5$ | % $Bi_2O_3$ by weight on the total | % $V_2O_5$ by weight on the total | % MgO by weight on the total | % $P_2O_5$ by weight on the total | % of V by weight on starting $BiPO_4$ | % of Mg by weight on starting $BiPO_4$ |
|---|---|---|---|---|---|---|---|
| 2.79 | 2–5.6 | 66.39–61.83 | 9.28–8.64 | 4.11–10.70 | 20.22–18.83 | 6 | 2.86–8.00 |
| 2.39 | 2–4.8 | 64.94–60.95 | 10.59–9.94 | 4.69–10.55 | 19.78–18.57 | 7 | 3.34–8.00 |
| 2.09 | 2–4.2 | 63.55–60.10 | 11.84–11.20 | 5.25–10.40 | 19.36–18.31 | 8 | 3.82–8.00 |
| 1.86 | 2–3.7 | 62.22–59.27 | 13.04–12.42 | 5.79–10.25 | 18.95–18.05 | 9 | 4.30–8.00 |
| 1.67 | 2–3.3 | 60.95–58.46 | 14.19–13.61 | 6.29–10.12 | 18.57–17.81 | 10 | 4.77–8.00 |
| 1.52 | 2–3.0 | 59.72–57.67 | 15.30–14.77 | 6.78–9.98 | 18.19–17.57 | 11 | 5.25–8.00 |
| 1.39 | 2–2.8 | 58.55–56.91 | 16.36–15.90 | 7.26–9.85 | 17.83–17.34 | 12 | 5.73–8.88 |

TABLE 4

Pigments Containing Zn

| Molar ratio $Bi_2O_3/V_2O_5$ | Molar ratio $BaO/V_2O_5$ | % $Bi_2O_3$ by weight on the total | % $V_2O_5$ by weight on the total | % ZnO by weight on the total | % $P_2O_5$ by weight on the total | % of V by weight on starting $BiPO_4$ | % of Zn by weight on starting $BiPO_4$ |
|---|---|---|---|---|---|---|---|
| 5.59 | 3–16.7 | 68.11–52.68 | 4.76–3.68 | 6.38–27.59 | 20.75–16.05 | 3 | 5.77–32.26 |
| 4.19 | 3–12.5 | 65.67–52.04 | 6.12–4.85 | 8.21–27.26 | 20.00–15.85 | 4 | 7.70–32.26 |
| 3.35 | 3–10.0 | 63.40–51.41 | 7.38–5.99 | 9.90–26.93 | 19.31–15.66 | 5 | 9.62–32.26 |
| 2.79 | 3–8.3 | 61.28–50.81 | 8.56–7.10 | 11.49–26.62 | 18.67–15.48 | 6 | 11.55–32.26 |
| 2.39 | 3–7.1 | 59.30–50.21 | 9.67–8.19 | 12.97–26.30 | 18.06–15.30 | 7 | 13.47–32.26 |
| 2.09 | 3–6.2 | 57.43–49.63 | 10.70–9.25 | 14.36–26.00 | 17.50–15.12 | 8 | 15.40–32.26 |
| 1.86 | 3–5.5 | 55.69–49.06 | 11.67–10.28 | 15.66–25.70 | 16.97–14.95 | 9 | 17.32–32.26 |
| 1.67 | 3–5.0 | 54.05–48.51 | 12.59–11.30 | 16.90–25.41 | 16.46–14.78 | 10 | 19.25–32.26 |
| 1.52 | 3–4.5 | 52.50–47.97 | 13.45–12.29 | 18.05–25.13 | 15.99–14.61 | 11 | 21.17–32.26 |
| 1.39 | 3–4.2 | 51.04–47.44 | 14.26–13.26 | 19.15–24.85 | 15.55–14.45 | 12 | 23.10–32.26 | for Ba:

maximum molar ratio $\frac{BaO}{V_2O_5}$ = 1.048 + 0.917 × molar ratio $\frac{Bi_2O_3}{V_2O_5}$ for Mg:

maximum molar ratio $\frac{MgO}{V_2O_5}$ = 2.0 × molar ratio $\frac{Bi_2O_3}{V_2O_5}$.

As previously stated, the molar ratio $Bi_2O_3/V_2O_5$ is comprised between 1.39 and 5.59 for Ca, Ba and Zn, and between 1.39 and 2.79 for Mg.

A molar ratio below 1.39 does not ensure full reaction between the reactants with consequential pollution of the color. A molar ratio greater than 2.79, in the case of Mg, yields products that will not have the desired color. A molar ratio greater than 5.59, in the case of Ca, Ba and Zn will give products having a too little saturated color.

There are preferred products containing Ca, Ba and Zn which have a molar ratio comprised between 1.39 and 2.79, and those containing Mg which have a molar ratio comprised between 1.39 and 2.09; these products have a greater color saturation and a greater tinting strength.

The preferred products containing Ca, Ba, Zn and Mg have a molar ratio comprised between 1.39 and 1.67.

It is necessary to maintain the molar ratio $MeO/V_2O_5$ within the range of values defined previously. The products having a molar ratio smaller than the minimum values or greater than the maximum values, in general do not have the desired color. Moreover, the products with a molar ratio greater than the maximum values, may contain free MeO. Vice versa, the variation of the molar ratio $MeO/V_2O_5$ within the limits or interval according to this invention, does not bring with it appreciable variations in the optical characteristics of the pigments.

The pigments according to this invention may contain more than one Me metal; they may be calcination products of mixtures containing, besides $BiPO_4$ and $V_2O_5$, two, three or all four MeO oxides, said calcination being conducted at temperatures comprised between 500° and 800° C.

In these products, the ratios between $V_2O_5$, $Bi_2O_3$, $P_2O_5$ and the various Me oxides (MeO) present in the products, usually must satisfy the following requirement: for each oxide MeO taken singly there must correspond a quantity of $V_2O_5$, $Bi_2O_3$ and $P_2O_5$ that will respect the values of the molar ratios of $Bi_2O_3/P_2O_5$, $Bi_2O_3/V_2O_5$ and $MeO/V_2O_5$ that are valid for the pigments based on the metal Me only.

In the case, for instance, of a pigment containing Ca, Ba and Mg, the total quantity of $V_2O_5$ (and of $Bi_2O_3$ and $P_2O_5$) is thus the sum of the partial quantity of $V_2O_5$ (and $Bi_2O_3$ and $P_2O_5$) such as to respect the values of the molar ratios to be applied in the case of a pigment respectively based on only Ca, only Ba and only Mg.

The pigments according to this invention may be obtained by means of the following process which is also an object of the invention.

There is first prepared a mixture of $BiPO_4$, $V_2O_5$ (or a vanadium compound capable of generating $V_2O_5$ in the subsequent calcining phase) and a Me oxide in which Me is Ca, Ba, Mg or Zn (or a Me compound capable of generating MeO during the successive calcining phase), the molar ratios between $Bi_2O_3$, $V_2O_5$, MeO and $P_2O_5$ in that mixture being equal to those defined previously. The mixture is thereupon calcined in the presence of air, at temperatures comprised between 500° C. and 800° C. when a product is prepared that contains Ca, Ba or Mg, and between 500° C. and 700° C. when a product is prepared containing Zn. This calcined product is slowly cooled down and then wet ground.

The starting bismuth phosphate may, for instance, be of either monoclinic or hexagonal crystalline structure. It is preferable to use a product the particles of which have sizes comprised between 0.2 and 1 microns.

The starting vanadium compounds may be, for instance, $V_2O_5$, $VO_2$, $V_2O_4$ or $NH_4VO_3$; the Me compounds may be oxides, hydroxides or salts, for instance carbonates.

The proportion of the starting compounds is chosen in accord with the characteristics of the pigment that is desired, taking into account the ratios between $Bi_2O_3$, $V_2O_5$, MeO and $P_2O_5$ previously defined. The last two columns of Tables 1, 2, 3 and 4 report respectively the percentage by weight of vanadium with respect to the starting $BiPO_4$ corresponding to each molar ratio $Bi_2O_3/V_2O_5$ and the percentages by weight of Me with respect to the starting $BiPO_4$ corresponding to the molar ratios $MeO/V_2O_5$ for each value of the ratio $Bi_2O_3/V_2O_5$.

The starting compounds are preferably mixed in the wet so as to ensure a good homogenization.

This mixture is then dried, for instance at between 100° and 130° C., and then homogenized, for instance in a mechanical mortar. Finally the mixture is calcined at the temperature previously defined.

The use of temperatures below 500° C. usually results in the formation of products with non-homogeneous colors or with a color saturation that is too low, while working at temperatures higher than the maximum values indicated, in general there will be observed as incipient fusion (melting) of the products.

In the case of pigments containing Ca, Ba or Mg, it is preferable to calcine at temperatures comprised between 600° C. and 800° C.; in the case of pigments containing Zn calcination temperatures comprised between 600° and 700° C. are preferred. The use of these temperatures allows in most cases to obtain products with a greater color saturation. The increase of the calcining temperature causes a slight rise of the $\lambda_D$, making it easier to obtain a $\lambda_D$ of about 574 m$\mu$, that is, a $\lambda_D$ like the one of the commercial chrome yellows and cadmium yellows with a greenish shade.

When mixtures of the oxides MeO are used, the calcining temperature may vary from 500° to 800° C. but preferably is comprised between 550° and 700° C.

The calcining is carried out in the presence of air under static conditions or, preferably, in a rotary furnace in order to ensure a better homogenization of the reactants. The duration of the calcining operation is comprised, in general, between 1 and 3 hours.

At the end of the calcining, the products are allowed to slowly cool down. For instance, they are brought down to temperatures comprised between 200° C. and room temperature in a time comprised between 3 and 24 hours. Thereafter, they are discharged from the furnace, cooled down, if necessary, to room temperature and finally wet-ground. It has been found that this type of grinding allows to obtain products that show optical characteristics better than those of the corresponding products that are dry ground. The wet-grinding may be carried out, for instance, in ball, microsphere or sand mills. In general, the calcined product undergoes a dry crushing before the wet-grinding. At the end of the grinding, the product is filtered, washed and dried, for instance, at 100°-130° C., and finally dry ground, for instance, in an automatic mortar.

The pigments thus obtained, in general, consist of particles having particle sizes comprised between 0.3 and 3 microns.

These pigments usually leave behind on a 325 mesh sieve a maximum residue of 0.5% by weight.

They are used in fields in which colored inorganic pigments are commonly used, and more particularly as colored pigments for paints and plastic materials. They show a higher thermic stability than the pigment consisting of BiVO$_4$ only. In fact, they can be prepared at a temperature up to 800° C., while the pigment consisting of only BiVO$_4$ can be prepared at temperatures up to 500° C. only.

The following examples are given in order to illustrate the invention in more detail and are not intended to be limiting.

EXAMPLES 1–4

Four pigments were prepared that contained respectively Mg (test 1), Ca (test 2), Ba (test 3) and Zn (test 4). There was used bismuth phosphate with a monoclinic structure, and in the form of particles having a mean particle size of about 0.5 micron.

In test 1 the starting substances were the following: 20 g of BiPO$_4$, 4.59 g of NH$_4$VO$_3$ (equal to 0.0392 mols of V and 10% of V by weight with respect to BiPO$_4$) and 2.06 g of MgO (equal to 0.0510 mols of Mg and 6.20% of Mg by weight with respect to BiPO$_4$).

In test 2 there were used: 20 g of BiPO$_4$, 3.67 g of NH$_4$VO$_3$ (equal to 0.0314 mols of V and 8% by weight of V with respect to BiPO$_4$) and 5.51 g of CaO (equal to 0.0983 mols of Ca and 19.7% by weight of Ca with respect to BiPO$_4$).

The substances used in test 3 were: 20 g of BiPO$_4$, 5.51 g of NH$_4$VO$_3$ (equal to 0.0471 mols of V and 12% by weight of V with respect to BiPO$_4$) and 10.97 g of BaCO$_3$ (equal to 0.0556 mols of Ba and 38.18% by weight of Ba with respect to BiPO$_4$).

In test 4, the starting materials were: 20 g of BiPO$_4$, 5.51 g of NH$_4$VO$_3$ (equal to 0.0471 mols of V and 12% by weight of V with respect to the BiPO$_4$) and 12.41 grams of ZnCO$_3$ (equal to 0.0989 mols of Zn and 32.26% by weight of Zn with respect to the BiPO$_4$).

The starting substances were thoroughly mixed together in the wet state in a beaker. The mixtures thus obtained were dried at 130° C., then again homogenized in an automatic "Pulverisette" mortar and finally calcined at 800° C. in tests 1 and 2, and at 600° C. in tests 3 and 4. The calcining was carried out in a static air furnace for one hour, in the presence of air. The products were then allowed to cool down to room temperature in about 20 hours. Thereafter the pigments were wet-ground in a ball mill, filtered and washed. The cakes were dried at 110° C. and at last dry-ground in an automatic Pulverisette mortar.

The compositions by weight of the pigments thus obtained were:

Test 1: 59.8% of Bi$_2$O$_3$; 13.9% of V$_2$O$_5$; 8% of MgO; 18.3% of P$_2$O$_5$.

Test 2: 54% Bi$_2$O$_3$; 10% V$_2$O$_5$; 19.5% CaO; 16.5% P$_2$O$_5$.

Test 3: 46.7% of Bi$_2$O$_3$; 13% of V$_2$O$_5$; 26% of BaO; 14.3% of P$_2$O$_5$.

Test 4: 47.4% of Bi$_2$O$_3$; 13.3% of V$_2$O$_5$; 24.8% of ZnO and 14.5% of P$_2$O$_5$.

The X-rays diffraction analysis carried out on a Siemens diffractometer, using a CuK α radiation, evidenced the presence of monoclinic BiVO$_4$ in all four samples. Samples 1, 2 and 3 contained a monazite type BiPO$_4$, while sample 4 contained a BiPO$_4$ of the low-temperature form type. All samples contained, moreover, compounds that could not be identified on the ASTM tables.

The mean particle size of the four samples proved to be:

| Sample 1: | 1.0 μ |
| Sample 2: | 0.5 μ |
| Sample 3: | 0.8 μ |
| Sample 4: | 0.4 μ |

The colorimetric characteristcs of the four pigments were determined on a dry film of paint 50 microns thick, obtained by dispersing, in a Hoover-type kneader, the parts of pigment in one part of vehicle of the following ponderal composition:

| | % by wt. |
|---|---|
| "Aeroplaz" (alkyd resin) | 68. |
| Soya oil | 76.3 |
| FL 30 (boiled linseed oil) | 19. |
| Drying mixture | 4.7 |

The drying mixture had the following composition, by weight:

| | |
|---|---|
| Ca naphthenate | 1.77% |
| Zr naphthenate | 5.31% |
| Co naphthenate | 6.9% |
| White spirit | 86.02% |

The colorimetric measurements were carried out on a "Ducolor" differential three-stimulus colorimeter model 220 marketed by Neotec Instruments Corp.

From the three-stimuli values Y, X and Z supplied by the instruments with regard to a standard calibrated with respect to Mg oxide, there were obtained the trichromatic coordinates (y, x) and, graphically, there were desumed the values of the dominant wave length ($\lambda_D$) and of the color saturation of the product (see in this connection, for instance, the treatise by A. G. Hardy: "Handbook of Colorimetry"; Massachusetts Institute of Technology; Cambridge, Massachusetts, 1936).

On the same apparatus there were also determined the reflectances $R_V$, $R_A$, $R_B$ respectively on the green, amber red and blue filters.

The optical characteristics of the four samples are recorded in Table 5 and, for comparative purposes, those of three commercial products: a "primerose" chrome yellow, a light cadmium yellow and a nickel titanate.

By examining the results reported in the table, it can be seen that the products obtained according to this invention show chromatic characteristics that are superior to those of nickel titanate and comparable with those of chrome yellow and cadmium yellow.

TABLE 5

| EXAMINED PRODUCT | $R_V$ | $R_A$ | $R_B$ | $\lambda_D$ | COLOR SATURATION IN % |
|---|---|---|---|---|---|
| Example 1 | 76.0 | 85.8 | 10.7 | 574.3 | 78.8 |
| Example 2 | 74.3 | 84.1 | 10.9 | 574.5 | 77.8 |
| Example 3 | 77.0 | 86.4 | 11.1 | 574.0 | 78.0 |
| Example 4 | 77.4 | 86.6 | 10.8 | 573.9 | 79.0 |
| Chrome Yellow | 75.5 | 84.6 | 10.4 | 574.0 | 79.0 |
| Cadmium Yellow | 76.7 | 85.7 | 10.7 | 574.0 | 79.0 |
| Nickel Titanate | 74.8 | 80.0 | 24.6 | 572.8 | 54.8 |

EXAMPLES 5-22

The same procedures as those described in Example 1 were followed, but varying the quantities of V and Mg with respect to the starting $BiPO_4$, the ratio $MgO/V_2O_5$ and the calcining temperature. The operating procedures and the optical characteristics of the pigments obtained, are recorded in Table 6.

EXAMPLES 23-41

Following the same procedures as those described in Example 2, there were varied the quantity of V and Ca with respect to the starting $BiPO_4$, the molar ratio $CaO/V_2O_5$ and the calcining temperature. The operating procedures and the optical characteristics of the pigments obtained are recorded in Table 7.

EXAMPLES 42-57

Example 3 was repeated, but varying the quantity of V and Ba with respect to the starting $BiPO_4$, the molar ratio $BaO/V_2O_5$ and the calcining temperature. The operating procedures and the optical characteristics of the pigments obtained are recorded in Table 8.

TABLE 6

| Pigments Containing Magnesium | | | | | | | | | |
|---|---|---|---|---|---|---|---|---|---|
| Example No. | % b.w. of V with respect to starting $BiPO_4$ | % b.w. of Mg with respect to starting $BiPO_4$ | Molar ratio $MgO/V_2O_5$ | Temperature °C. | $R_V$ | $R_A$ | $R_B$ | $\lambda_D$ | Color saturation in % |
| 5 | 6 | 2.86 | 2.0 | 800 | 71.3 | 80.2 | 12.7 | 574.3 | 73.8 |
| 6 | 8 | 3.82 | 2.0 | 500 | 68.5 | 74.8 | 13.9 | 573.2 | 70.0 |
| 7 | 8 | 3.82 | 2.0 | 800 | 74.2 | 83.8 | 11.4 | 574.4 | 77.0 |
| 8 | 10 | 4.77 | 2.0 | 500 | 68.3 | 75.4 | 13.0 | 573.6 | 71.5 |
| 9 | 10 | 4.77 | 2.0 | 800 | 73.1 | 82.6 | 10.6 | 574.5 | 78.0 |
| 10 | 12 | 5.73 | 2.0 | 800 | 72.5 | 82.5 | 10.2 | 574.6 | 78.8 |
| 11 | 6 | 5.16 | 3.6 | 500 | 63.9 | 69.3 | 13.2 | 573.0 | 69.2 |
| 12 | 6 | 5.16 | 3.6 | 800 | 76.6 | 85.8 | 12.8 | 574.2 | 75.0 |
| 13 | 6 | 7.73 | 5.4 | 800 | 71.0 | 80.3 | 14.7 | 574.8 | 70.0 |
| 14 | 8 | 5.73 | 3.0 | 500 | 78.9 | 86.5 | 14.5 | 573.3 | 72.7 |
| 15 | 8 | 5.73 | 3.0 | 800 | 77.8 | 87.6 | 11.3 | 574.3 | 77.8 |
| 16 | 8 | 8.02 | 4.2 | 500 | 74.2 | 81.4 | 14.2 | 573.4 | 71.3 |
| 17 | 8 | 8.02 | 4.2 | 800 | 75.2 | 84.5 | 12.3 | 574.4 | 75.7 |
| 18 | 10 | 6.21 | 2.6 | 500 | 72.3 | 79.8 | 11.8 | 573.6 | 75.4 |
| 19 | 12 | 6.87 | 2.4 | 500 | 69.3 | 77.3 | 12.1 | 574.1 | 74.0 |
| 20 | 12 | 6.87 | 2.4 | 800 | 72.6 | 82.7 | 10.0 | 574.8 | 79.0 |
| 21 | 12 | 8.02 | 2.8 | 500 | 74.7 | 83.0 | 13.3 | 573.8 | 73.3 |
| 22 | 12 | 8.02 | 2.8 | 800 | 75.8 | 86.2 | 10.0 | 574.7 | 79.8 |

TABLE 7

| Pigments Containing Calcium | | | | | | | | | |
|---|---|---|---|---|---|---|---|---|---|
| Example No. | % b.w. of V with respect to starting $BiPO_4$ | % b.w. of Ca with respect to starting $BiPO_4$ | Molar ratio $CaO/N_2O_5$ | Temperature °C. | $R_V$ | $R_A$ | $R_B$ | $\lambda_D$ | Color saturation in % |
| 23 | 3 | 3.54 | 3.0 | 500 | 80.4 | 87.1 | 18.7 | 573.0 | 66.2 |
| 24 | 6 | 7.08 | 3.0 | 800 | 72.3 | 81.7 | 12.4 | 574.5 | 74.5 |
| 25 | 8 | 9.44 | 3.0 | 500 | 70.5 | 78.9 | 12.3 | 574.0 | 74.0 |
| 26 | 8 | 9.44 | 3.0 | 800 | 74.1 | 84.3 | 11.0 | 574.6 | 77.5 |
| 27 | 10 | 11.80 | 3.0 | 800 | 72.4 | 83.0 | 10.1 | 575.0 | 79.0 |
| 28 | 12 | 14.16 | 3.0 | 500 | 68.2 | 76.9 | 10.4 | 574.3 | 77.0 |
| 29 | 12 | 14.16 | 3.0 | 800 | 71.9 | 82.8 | 9.4 | 575.1 | 80.0 |
| 30 | 3 | 10.62 | 9.0 | 800 | 78.0 | 86.0 | 15.4 | 573.7 | 71.0 |
| 31 | 6 | 12.74 | 5.4 | 600 | 76.8 | 84.4 | 15.0 | 573.5 | 71.0 |
| 32 | 6 | 12.74 | 5.4 | 800 | 75.6 | 86.0 | 9.8 | 574.7 | 80.3 |
| 33 | 8 | 13.85 | 4.4 | 600 | 77.3 | 85.1 | 14.2 | 573.4 | 72.8 |
| 34 | 8 | 13.85 | 4.4 | 800 | 74.9 | 85.5 | 9.6 | 574.7 | 80.5 |
| 35 | 8 | 19.70 | 6.3 | 800 | 74.3 | 84.1 | 10.9 | 574.5 | 77.8 |
| 36 | 10 | 15.73 | 4.0 | 600 | 76.4 | 85.0 | 12.0 | 573.8 | 76.5 |
| 37 | 10 | 15.73 | 4.0 | 800 | 73.5 | 84.2 | 9.1 | 574.8 | 81.2 |
| 38 | 10 | 19.67 | 5.0 | 600 | 76.1 | 84.4 | 12.9 | 573.7 | 74.8 |
| 39 | 10 | 19.67 | 5.0 | 800 | 73.1 | 83.4 | 9.5 | 574.7 | 80.0 |
| 40 | 12 | 16.99 | 3.5 | 800 | 71.2 | 82.6 | 8.3 | 575.0 | 82.2 |
| 41 | 12 | 19.75 | 4.2 | 600 | 75.8 | 83.9 | 13.1 | 573.6 | 74.0 |

TABLE 8

| Pigments Containing Barium | | | | | | | | | |
|---|---|---|---|---|---|---|---|---|---|
| Example No. | % b.w. of V with respect to starting $BiPO_4$ | % b.w. of Ba with respect to starting $BiPO_4$ | Molar ratio $BaO/V_2O_5$ | Temperature °C. | $R_V$ | $R_A$ | $R_B$ | $\lambda_D$ | Color saturation in % |
| 42 | 3 | 8.1 | 2.0 | 800 | 76.1 | 83.6 | 17.9 | 573.7 | 66.3 |
| 43 | 6 | 16.2 | 2.0 | 500 | 75.5 | 83.1 | 14.9 | 573.5 | 70.8 |
| 44 | 6 | 16.2 | 2.0 | 800 | 71.8 | 80.4 | 12.2 | 574.2 | 74.7 |
| 45 | 10 | 26.96 | 2.0 | 500 | 73.9 | 81.6 | 12.6 | 573.4 | 74.4 |
| 46 | 10 | 26.96 | 2.0 | 800 | 73.0 | 82.0 | 11.2 | 574.3 | 77.2 |
| 47 | 12 | 32.35 | 2.0 | 500 | 72.2 | 79.9 | 11.8 | 573.5 | 75.2 |

TABLE 8-continued

Pigments Containing Barium

| Example No. | % b.w. of V with respect to starting BiPO$_4$ | % b.w. of Ba with respect to starting BiPO$_4$ | Molar ratio BaO/V$_2$O$_5$ | Temperature °C. | R$_V$ | R$_A$ | R$_B$ | λ$_D$ | Color saturation in % |
|---|---|---|---|---|---|---|---|---|---|
| 48 | 12 | 32.35 | 2.0 | 600 | 71.8 | 79.0 | 11.9 | 573.3 | 75.0 |
| 49 | 12 | 32.35 | 2.0 | 800 | 67.1 | 75.3 | 9.7 | 574.0 | 78.0 |
| 50 | 3 | 12.13 | 3.0 | 800 | 75.6 | 82.2 | 16.8 | 573.1 | 68.0 |
| 51 | 3 | 25.07 | 6.2 | 800 | 78.0 | 84.8 | 17.1 | 573.0 | 68.0 |
| 52 | 6 | 24.26 | 3.0 | 800 | 76.5 | 85.6 | 11.6 | 574.0 | 77.2 |
| 53 | 6 | 29.12 | 3.6 | 800 | 76.3 | 84.6 | 12.0 | 573.6 | 76.5 |
| 54 | 8 | 32.35 | 3.0 | 800 | 75.1 | 84.4 | 10.9 | 574.2 | 78.7 |
| 55 | 10 | 35.05 | 2.6 | 600 | 77.7 | 86.7 | 13.0 | 573.7 | 75.0 |
| 56 | 10 | 35.05 | 2.6 | 800 | 74.3 | 83.7 | 11.1 | 574.4 | 77.5 |
| 57 | 12 | 38.82 | 2.4 | 800 | 73.6 | 82.5 | 11.5 | 574.2 | 77.0 |

EXAMPLES 58–80

Following the procedures described in Example 4, there were varied the quantity of V and Zn with respect to the starting BiPO$_4$, the molar ratio ZnO/V$_2$O$_5$ and the calcining temperature. The operating procedures and the optical characteristics of the pigments thus obtained are recorded in Table 9.

| | |
|---|---|
| R$_V$ | 73.7 |
| R$_A$ | 83.4 |
| R$_B$ | 10.1 |
| λ$_D$ | 574.3 mµ |
| Color saturation | 79.2%. |

TABLE 9

Pigments Containing Zinc

| Example No. | % b.w. of V with respect to starting BiPO$_4$ | % b.w. of Zn with respect to starting BiPO$_4$ | Molar ratio ZnO/V$_2$O$_5$ | Temperature °C. | R$_V$ | R$_A$ | R$_B$ | λ$_D$ | Color saturation in % |
|---|---|---|---|---|---|---|---|---|---|
| 58 | 3 | 5.77 | 3.0 | 700 | 76.1 | 83.8 | 14.0 | 573.4 | 72.7 |
| 59 | 6 | 11.55 | 3.0 | 500 | 79.2 | 87.4 | 12.5 | 573.4 | 73.3 |
| 60 | 6 | 11.55 | 3.0 | 700 | 75.2 | 84.1 | 11.1 | 574.0 | 77.7 |
| 61 | 8 | 15.40 | 3.0 | 500 | 74.6 | 81.8 | 12.4 | 573.2 | 75.0 |
| 62 | 8 | 15.40 | 3.0 | 700 | 74.0 | 83.7 | 10.0 | 574.4 | 79.4 |
| 63 | 10 | 19.25 | 3.0 | 500 | 71.0 | 78.7 | 10.6 | 573.6 | 77.3 |
| 64 | 10 | 19.25 | 3.0 | 700 | 74.0 | 83.5 | 9.9 | 574.3 | 79.8 |
| 65 | 12 | 23.10 | 3.0 | 500 | 73.0 | 80.8 | 11.9 | 573.6 | 75.5 |
| 66 | 12 | 23.10 | 3.0 | 700 | 73.5 | 83.0 | 9.8 | 574.3 | 80.0 |
| 67 | 3 | 31.95 | 16.6 | 500 | 76.0 | 82.0 | 17.4 | 573.0 | 66.7 |
| 68 | 6 | 20.79 | 5.4 | 500 | 77.4 | 84.7 | 13.2 | 573.1 | 74.3 |
| 69 | 6 | 20.79 | 5.4 | 700 | 75.2 | 83.5 | 12.2 | 573.7 | 75.3 |
| 70 | 6 | 32.18 | 8.36 | 500 | 79.3 | 87.4 | 13.1 | 573.3 | 75.2 |
| 71 | 6 | 32.18 | 8.36 | 700 | 75.2 | 83.4 | 13.5 | 573.7 | 73.3 |
| 72 | 8 | 22.58 | 4.4 | 500 | 74.2 | 81.3 | 12.2 | 573.1 | 75.2 |
| 73 | 8 | 22.58 | 4.4 | 700 | 74.4 | 83.4 | 10.9 | 574.0 | 78.0 |
| 74 | 8 | 31.82 | 6.2 | 500 | 72.0 | 79.2 | 12.6 | 573.4 | 74.0 |
| 75 | 8 | 31.82 | 6.2 | 700 | 73.3 | 82.8 | 11.4 | 574.4 | 76.8 |
| 76 | 10 | 25.66 | 4.0 | 500 | 77.2 | 85.3 | 11.6 | 573.5 | 77.2 |
| 77 | 10 | 25.66 | 4.0 | 700 | 70.5 | 81.3 | 9.8 | 575.0 | 79.2 |
| 78 | 10 | 32.08 | 5.0 | 500 | 77.7 | 86.1 | 12.2 | 573.5 | 76.0 |
| 79 | 12 | 27.72 | 3.6 | 500 | 72.2 | 79.0 | 11.8 | 573.1 | 75.0 |
| 80 | 12 | 32.26 | 4.2 | 700 | 73.0 | 83.2 | 9.4 | 574.7 | 80.5 |

EXAMPLE 81

This example illustrates a pigment containing, at the same time, the four bivalent metals Ba, Ca, Mg and Zn. 71.3 g of BiPO$_4$ as used in Examples 1–4; 15.3 g of NH$_4$VO$_3$ (equal to 0.0654 mols of V$_2$O$_5$); 5.09 g of BaO (equal to 0.0322 mols); 3.47 g of CaO (equal to 0.0619 mols); 2.0 g of MgO (equal to 0.0496 mols) and 6.21 g of ZnO (equal to 0.0763 mols), were thoroughly mixed together in the wet. Thereafter, the procedure of Examples 1-4 were followed, carrying out the calcining at 700° C.

The pigment thus obtained had the following percent by weight composition: Bi$_2$O$_3$=54.67%; V$_2$O$_5$=11.90%; BaO=5.09%; CaO=3.47%; MgO=2.00%; ZnO=6.21%; P$_2$O$_5$=16.66%.

The optical properties of the pigment were as follows:

Comparison of these values with those obtained for the commercial chrome yellow and cadmium yellow pigments as reported in Table 5, shows that the optical properties of the pigment according to the invention are similar to those of said commercial products.

The X-rays diffraction analysis showed the presence of monoclinic BiVO$_4$ and monoclinic BiPO$_4$; moreover there are present compounds that could not be identified through the ASTM tables. The mean particle size of the pigment was about 0.8µ.

EXAMPLES 82–95

The following examples illustrate pigments containing at the same time two or three bivalent metals. The procedures described in Example 81 was followed but varying the nature and quantity of bivalent metal oxides, the ponderal ratio V/BiPO$_4$ and the calcining temperature.

The operating procedures, the percentages by weight of the components and the optical properties of the pigments obtained are recorded in Table 10.

TABLE 10

Pigments Containing Two or Three Bivalent Metals

| Ex. No. | % b.w. of V with respect to starting BiPO$_4$ | Temperature °C. | % Bi$_2$O$_3$ by weight on total | % V$_2$O$_5$ by weight on total | % BaO by weight on total | % CaO by weight on total | % MgO by weight on total | % ZnO by weight on total | % P$_2$O$_5$ by weight on total | R$_V$ | R$_A$ | R$_B$ | λ$_D$ | Color Saturation in % |
|---|---|---|---|---|---|---|---|---|---|---|---|---|---|---|
| 82 | 10.0 | 700 | 51.23 | 11.93 | 2.03 | — | — | 19.19 | 15.61 | 72.0 | 83.1 | 10.1 | 575.0 | 79.0 |
| 83 | 10.0 | 700 | 51.36 | 11.96 | 6.10 | — | — | 14.92 | 15.65 | 72.9 | 82.2 | 10.3 | 574.3 | 78.8 |
| 84 | 10.0 | 700 | 51.49 | 12.00 | 10.17 | — | — | 10.66 | 15.68 | 71.6 | 81.2 | 10.1 | 574.5 | 78.8 |
| 85 | 10.0 | 700 | 51.62 | 12.02 | 14.24 | — | — | 6.40 | 15.72 | 70.1 | 79.8 | 9.9 | 574.7 | 78.7 |
| 86 | 10.0 | 700 | 51.75 | 12.05 | 18.31 | — | — | 2.13 | 15.76 | 73.6 | 82.3 | 12.9 | 574.2 | 74.0 |
| 87 | 10.0 | 800 | 56.38 | 13.13 | 10.17 | — | 3.15 | — | 17.17 | 68.2 | 77.5 | 9.9 | 574.6 | 78.0 |
| 88 | 9.0 | 800 | 52.90 | 11.06 | 10.17 | 9.75 | — | — | 16.11 | 72.5 | 81.3 | 10.0 | 574.1 | 79.2 |
| 89 | 9.9 | 800 | 56.44 | 12.98 | — | 8.18 | 5.20 | — | 17.20 | 76.0 | 86.7 | 10.4 | 574.7 | 79.2 |
| 90 | 10.0 | 700 | 53.36 | 12.43 | — | 9.51 | — | 8.45 | 16.25 | 76.0 | 86.8 | 10.1 | 574.8 | 79.9 |
| 91 | 10.0 | 700 | 57.57 | 13.41 | — | — | 4.29 | 7.18 | 17.54 | 73.8 | 83.7 | 10.1 | 574.4 | 79.2 |
| 92 | 9.1 | 800 | 55.83 | 11.81 | 6.78 | 6.19 | 2.39 | — | 17.01 | 72.3 | 82.7 | 9.5 | 574.8 | 80.0 |
| 93 | 7.9 | 700 | 56.81 | 10.44 | 6.78 | 4.83 | — | 3.83 | 17.31 | 73.5 | 83.4 | 10.3 | 574.5 | 78.8 |
| 94 | 9.2 | 700 | 54.08 | 11.64 | 6.78 | — | 2.56 | 8.47 | 16.47 | 72.4 | 82.0 | 10.7 | 574.4 | 78.0 |
| 95 | 10.1 | 700 | 53.40 | 12.50 | — | 6.50 | 2.86 | 8.47 | 16.27 | 70.4 | 79.9 | 10.8 | 574.6 | 77.2 |

What we claim is:

1. Greenish-yellow pigments based on bismuth vanadate and having a dominant wave length comprised between 573 and 575 mμ, characterized in that the pigments consist of the calcination product, obtained in the presence of air, of a mixture of BiPO$_4$, V$_2$O$_5$ and of an oxide MeO wherein Me is Ca, Ba, Mg or Zn, said calcination being carried out at a temperature of between 500° and 800° C. when Me is Ba, Ca or Mg and of between 500° and 700° C. when Me is Zn, the calcining being followed by a slow cooling down and by a subsequent wet-grinding, and the pigments being further characterized in that the molar ratio Bi$_2$O$_3$/P$_2$O$_5$ is equal to 1 and the molar ratio Bi$_2$O$_3$/V$_2$O$_5$ is comprised between 1.39 and 5.59 when Me is Ca, Ba or Zn and between 1.39 and 2.79 when Me is Mg, and in that the molar ratio MeO/V$_2$O$_5$ varies according to the molar ratio Bi$_2$O$_3$/V$_2$O$_5$ as follows:

| molar ratio Bi$_2$O$_3$/V$_2$O$_5$ | molar ratio CaO/V$_2$O$_5$ and ZnO/V$_2$O$_5$ | molar ratio BaO/V$_2$O$_5$ | molar ratio MgO/V$_2$O$_5$ |
|---|---|---|---|
| 5.59 | 3–16.7 | 2–6.2 | — |
| 4.19 | 3–12.5 | 2–4.8 | — |
| 3.35 | 3–10.0 | 2–4.2 | — |
| 2.79 | 3–8.3 | 2–3.6 | 2–5.6 |
| 2.39 | 3–7.1 | 2–3.2 | 2–4.8 |
| 2.09 | 3–6.2 | 2–3.0 | 2–4.2 |
| 1.86 | 3–5.5 | 2–2.8 | 2–3.7 |
| 1.67 | 3–5.0 | 2–2.6 | 2–3.3 |
| 1.52 | 3–4.5 | 2–2.4 | 2–3.0 |
| 1.39 | 3–4.2 | 2–2.3 | 2–2.8 |

2. Greenish-yellow pigments according to claim 1, characterized in that in the products containing Ca, Ba or Zn, the molar ratio Bi$_2$O$_3$/V$_2$O$_5$ is comprised between 1.39 and 2.79.

3. Greenish-yellow pigments according to claim 1, characterized in that in the products containing Mg, the molar ratio Bi$_2$O$_3$/V$_2$O$_5$ is comprised between 1.39 and 2.09.

4. Process for obtaining a greenish-yellow pigment based on bismuth vanadate and having a dominant wave length between 573 and 575 mμ, which process comprises mixing BiPO$_4$, V$_2$O$_5$ or a vanadium compound capable of generating V$_2$O$_5$ at high temperature, and an oxide MeO in which Me is Ca, Ba, Mg or Zn, or an Me compound capable of generating MeO at high temperature, and then calcining the mixture at a temperature of from 500° C. to 800° C. when Me in MeO is Ca, Ba, or Mg, and at a temperature of from 500° C. to 700° C. when Me in MeO is zinc, to obtain a composition in which BiO$_3$ and P$_2$O$_5$ are present in a molar ratio of 1, and Bi$_2$O$_3$/V$_2$O$_5$ are present in a molar ratio of from 1.39 to 5.59 when Me in MeO is Ca, Ba or Zn and in a molar ratio of 1.39 to 2.79 when Me in MeO is Mg; thereafter slowly cooling the calcination product, and then subjecting it to wet-grinding.

5. The process according to claim 4, in which, when Me in MeO is Ca, Ba, or Mg, the mixture is calcined at a temperature of from 600° to 800° C.

6. The process according to claim 4, in which, when Me in MeO is Zn, the mixture is calcined at a temperature of from 600° C. to 700° C.

UNITED STATES PATENT AND TRADEMARK OFFICE
CERTIFICATE OF CORRECTION

PATENT NO. : 4,251,283
DATED : February 17, 1981
INVENTOR(S) : Luigi BALDUCCI et al It is certified that error appears in the above—identified patent and that said Letters Patent is hereby corrected as shown below:

Columns 3-4 - Table 2 - line 1 of Col. 6

"20.4" should read - - - 20.41 - - -.

Signed and Sealed this

Twenty-third Day of June 1981

[SEAL]

Attest:

RENE D. TEGTMEYER

Attesting Officer     Acting Commissioner of Patents and Trademarks